FIG.-1

INVENTOR.
JACK E. HORNER

INVENTOR.
JACK E. HORNER

BY Fraser and Bogucki

ATTORNEYS

United States Patent Office 3,361,150
Patented Jan. 2, 1968

3,361,150
WATER CONDITIONING CONTROL SYSTEM
Jack E. Horner, Santa Ana, Calif., assignor to Universal Interloc Inc., Santa Ana, Calif., a corporation of California
Filed Jan. 6, 1965, Ser. No. 423,715
18 Claims. (Cl. 137—93)

ABSTRACT OF THE DISCLOSURE

An instrument automatically responsive to anodic corrosion tendencies of a circulating fluid is combined with different individual automatic controllers such as pH, corrosivity, and dissolved solids controllers, for maintaining prescribed treatment levels and for automatically restoring safe treatment levels and warning against possible malfunction whenever the corrosion rate exceeds a predetermined safe level. If treatment levels being maintained individually by the different automatic controllers be ineffective, or should malfunction occur in one or more individual controllers, the corrosion responsive instrument senses any significant increase in the corrosion rate and responds to temporarily interrupt the normal operation of the individual controllers to restore a safe non-corrosive condition, after which the individual controllers are returned to normal operation.

---

This invention relates to industrial water conditioning systems, and more particularly to a system for automatically monitoring and controlling various characteristics of the water to minimize system failures resulting from corrosion, scale formation and the like.

Water has many important industrial uses most of which require some form of water conditioning. Regardless of the purity of the water supply available, additional treatment is necessary to minimize undesirable characteristics and add desirable properties so that the water is better suited for its intended use. Frequently, fresh water is subjected to preliminary external treatment before being introduced into the system to reduce the hardness and alkalinity and to remove suspended solids. However, additional internal chemical treatments are normally required for continuing protection of the system against scale, corrosion and other potential sources of trouble in water circulation systems.

In most modern industrial systems, especially in areas where fresh water supplies are limited, water is recirculated for continuous reuse to prevent waste. Only water lost from the system through evaporation and selected draining need be replaced. However, continuous reuse increases the concentration of troublesome impurities to levels that could cause serious damage and costly failures if internal treatment is not used to suppress the resulting harmful effects.

Whereas control of scale formation and corrosion is of primary importance in any circulating water system, it is particularly critical in recirculating systems where evaporation rates are high, such as in large scale cooling and air conditioning equipment. If a serious scaling or corrosive condition is not corrected, continued recirculation can cause the harmful condition to become worse at an ever increasing rate. System components will rapidly deteriorate, finally resulting in a sudden and unexpected failure of the system. If, for example, the cooling system is used to regulate operating temperatures in expensive motors or electrical and electronic equipment, such rapid unexpected system failures could prove most costly.

However, corrosion and scale formation resulting from water impurities can be controlled or virtually eliminated if the water in the system is properly treated. For example, the primary sources of scale formation are the calcium and magnesium salts, especially calcium carbonate ($CaCO_3$). In recirculating water systems, the scale forming tendencies greatly increase as these salts become more concentrated by evaporation of the water. One of the most effective and economical methods of preventing scale formation even in the presence of very high salt concentrations is by acid treatment. Because of its low cost, sulfuric acid is most frequently used to convert the primary scale producing salt calcium carbonate to considerably more soluble calcium sulfate. Also, lowering the pH helps to reduce the scaling tendency. If properly administered, treatment can be used to reduce the alkalinity to a point that prevents scale formation without producing an overly acid condition corrosive to the metal in the system.

On the other hand, the principal factors influencing corrosion are certain water characteristics, the temperature, the rate of water flow through the system and the presence of dissimilar metals. The corrosive properties of the water itself, as commonly expressed by the Langelier saturation index, may depend on the presence of dissolved oxygen and carbon dioxide, the pH of the circulating water and the concentration of dissolved solids for the following reasons. In evaporative recirculating cooling system, oxygen dissolved from the atmosphere attacks ferrous metals in the system by oxidation causing corrosive pitting. Increased flow rates tend to bring larger quantities of oxygen into contact with cathodic oxidizing surfaces. This increases the corrosion rate since the oxygen combines with hydrogen formed at the cathodic surface thereby producing a depolarization effect. Acids can be very corrosive to certain metals, whereas dissolved solids add to the conductivity of the water thus favoring increased corrosion.

Comomnly corrosion can be effectively suppressed in a number of ways including adding corrosion inhibitors, limiting the concentration of dissolved solids, controlling the pH level and removing oxygen and carbon dioxide. In cooling water systems, the corrosion inhibitors most frequently employed are chromates, polyphosphates and dianodic mixtures of the two which, when added to the water in the system, restrain anodic corrosion reactions. Acceptable dissolved solid concentrations can be maintained simply by adding fresh water to replace the water with high dissolved salt concentrations already in the system.

In the past, various devices have been employed for adding the treatment ingredients needed to maintain the various water characteristics at safe levels. The addition of these ingredients could sometimes be automatically controlled in accordance with measurements made of the existing levels in the system. For example, acid flow might be controlled using a pH meter, and fresh water might be added in accordance with the measured conductivity level.

However, controlling each water characteristic independently does not adequately protect the system since the various factors affecting corrosion and scale formation are to a large extent dependent upon one another. For example, while an acidic pH value prevents scaling, it can cause corrosion. Also, the addition of a corrosion inhibitor increases the concentration of dissolved solids to raise the conductivity level. Sometimes the formation of calcium carbonate scale can act as a corrosion inhibitor, but in most instances it actually increases corrosion damage by subjecting anodic areas to localized attack. Therefore, it is most difficult to protect a system from corrosion and scale formation damage merely by attempting to maintain each water characteristic independently at given levels. With a special purpose computer it would be possible to relate each control level to the others, but a reliable computer with this capability would cost more than could normally be justified, when compared to the cost of replacing the entire cooling system.

Therefore, it is an object of the present invention to provide a low cost industrial water conditioning system that automatically suppresses corrosion and scale formation and also accurately measures corrosion to protect the system from damage.

Another object of the present invention is to provide an industrial water conditioning system which automatically controls the pH of the water to prevent scaling, and which operates through a simple interlock arrangement to effectively suppress corrosion damage.

A further object of this invention is to provide an automatic water conditioning system wherein the operations of various means for automatically controlling the pH and conductivity of the water and for adding corrosion inhibitors to the water are coordinated to effectively prevent scaling and suppress corrosion damage.

Still another object of the present invention is to provide an automatic water conditioning system for determining and thereafter maintaining optimum internal treatment conditions that minimize the possibility of damage to industrial water systems and associated equipment resulting from corrosion and scale formation.

Still a further object of the present invention is to provide an automatic water conditioning system having means for automatically measuring the relative anodic corrosion rate, which means provides an interlock operation to insure that internal water treatments are effective in suppressing corrosion and preventing scale formation.

Yet another object of the present invention is to provide a system capable of automatically measuring and suppressing the anodic corrosion rate in an industrial circulating water system.

These and other objects are accomplished in accordance with this invention by providing an interlock arrangement which uniquely coordinates the operation of a device that automatically measures corrosion occuring in the system with the operations of various treatment apparatus that automatically maintain different internal water treatments at given levels to suppress corrosion and scale formation. The device measuring corrosion is coupled to actuate an interlock mechanism that automatically eliminates from the system certain corrosive water conditions that can occur even though recommended treatment levels are being maintained by the automatic treatment apparatus. With the interlock feature, chemical ingredients needed to suppress corrosion and prevent scale formation can be added automatically using inexpensive automatic treatment apparatus consisting of simple off-on level sensing switches. This is possible since the corrosion is monitored to sense conditions wherein improper treatment has created potentially dangerous corrosive levels. Moreover, the various elements of this combination cooperate in a manner that provides greater accuracy in measuring corrosion rate and in measuring and controlling the various water characteristics and treatment levels.

In accordance with a particular aspect of this invention, the corrosion measuring device may be designed to continuously and automatically measure the anodic corrosion rate within the system. The measured corrosion rate depends on certain water characteristic levels controlled by the different automatic treatment apparatus. When the measured corrosion rate exceeds a predetermined level, the interlock mechanism is actuated to interrupt further addition of certain treatment chemicals until a substantial portion of the corrosive water in the system has been removed from the system and replaced by fresh water. After a short interval, normal automatic operation of the treatment apparatus is restored so that needed chemical ingredients can be added. This allows the automatic treatment apparatus to begin again from low treatment levels, instead of continuing to function in an attempt to correct corrosive conditions that may already be due to excessive or insufficient concentration of one or more treatment chemicals.

In accordance with further aspects of this invention, measurements of the corrosion rate and the addition to the system of chemical treatments and fresh water can be monitored using a time base recorder. The causes of certain system malfunctions can easily and quickly be determined by inspecting the time record made of the operation of the different treatment apparatus. In addition, the interlock mechanism may be used to actuate an alarm whenever a corrosive water condition is sensed so as to call attention to possible control system malfunctions. Also, the treatment apparatus can be interlocked with the main circulating pump of the circulating system to prevent chemicals from being added unless the water is being circulated to distribute the chemicals properly throughout the system.

These and other aspects of the invention can best be understood by referring to the following detailed description taken in conjunction with the accompanying drawings, in which:

Figure 1:
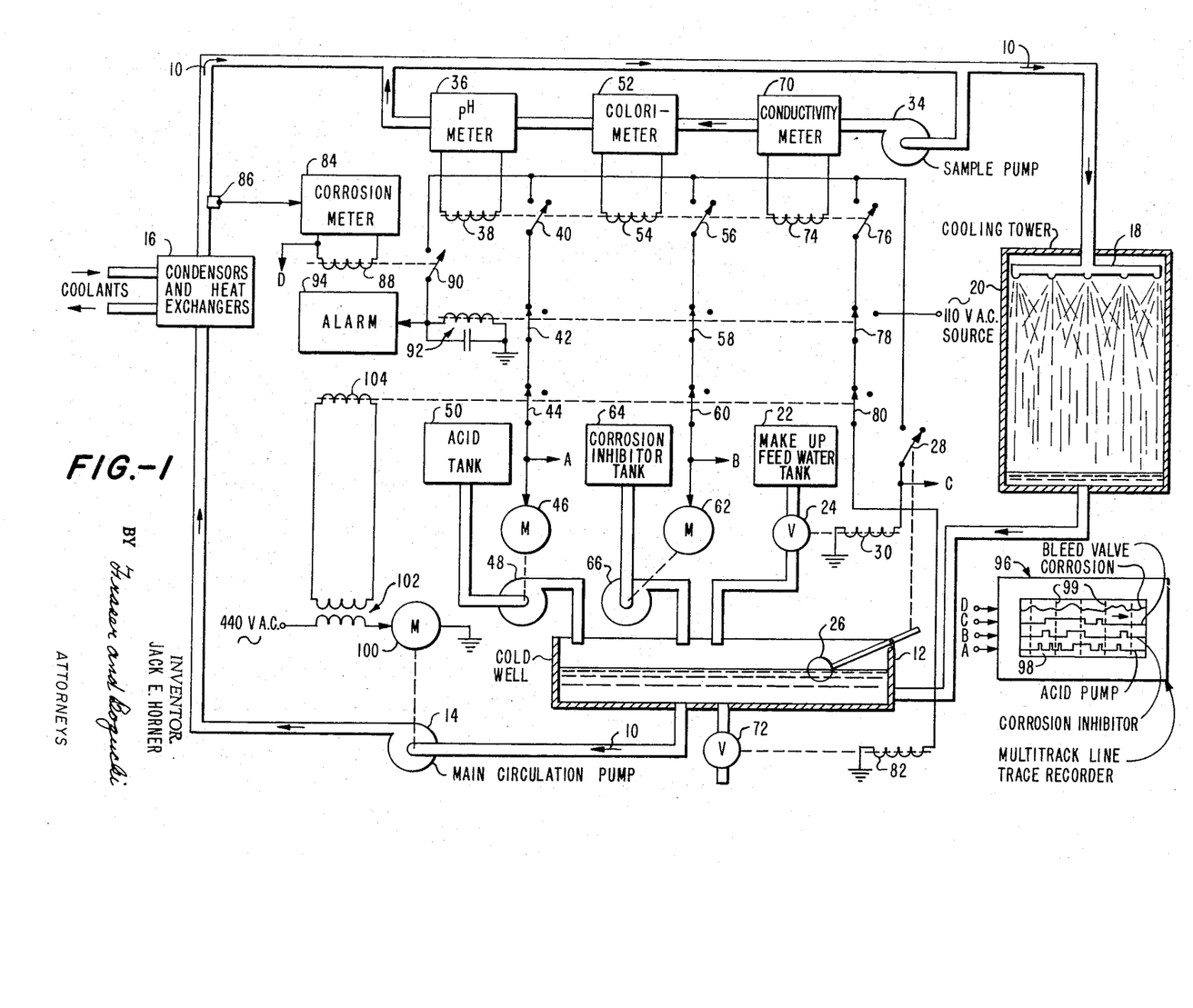
FIG. 1 is a schematic drawing, shown partially in block diagram form, illustrating a preferred embodiment of an automatic water conditioning system in accordance with the invention which is incorporated for operation with a recirculating evaporative industrial cooling system.

Referring now to FIG. 1, the primary elements of a recirculating evaporative industrial cooling system are shown in the simplified schematic form to aid in understanding the operation of the automatic water conditioning system in accordance with the invention. Arrows 10 indicate the direction of recirculating water flow in the conduits. As shown, relatively cool water is drawn from a cold well 12 by a main circulation pump 14 and pumped through condensers and heat exchangers 16 so as to pick up heat from coolants being used, such as refrigerants or even air. The warmer water emerging from the outlet of the condensers and heat exchangers 16 then goes to a spray nozzle 18 or other such arrangement in a cooling tower 20. The hot spray cools as it falls due to some of it evaporating into the surrounding air in the tower 20. The cooled spray collected at the bottom of the cooling tower 20 is then drained back to the cold well 12 to complete the recirculation cycle.

Water lost from the system by evaporation in the tower or otherwise must be replaced to maintain an approximately constant volume of recirculating water in the system. Fresh water, which is normally first subjected to appropriate external treatment, is added from a makeup feed water tank 22 through a makeup feed valve 24 to maintain a substantially constant level in the cold well 12. A float 26 or any other suitable liquid level in the cold well 12. A float 26 or any other suitable liquid level sensing arrangement controls operation of the makeup feed valve 24. In this case, the float 26 is mechanically coupled to close a normally open switch 28 to deliver power from 110-volt AC line source to a solenoid coil 30 for opening the solenoid actuated valve 24 to add fresh water.

Recirculating evaporative cooling water systems of this general type have a wide variety of industrial uses, especially for air conditioning and cooling and large scale industrial refrigeration. It should be understood, however, that the invention is not limited to any particular type of system, but is generally applicable to any type of circulating water system wherein automatic internal treatment is useful to suppress corrosion and scaling. For example, the concepts of this invention are easily extended by analogy to recirculating heating systems and once-through or non-recirculating water systems.

As shown, the chemical treatments and fresh water may be added to the water in the cold well 12 for circulation through the system. In the past, the addition of these chemical treatments has been accomplished in a number of different ways. In some cases, bulk amounts of chemical treatment ingredients have simply been added by hand at certain intervals. In other instances, the practice has been to proportion the chemical treatments in accordance with the amount of fresh water being added. However, neither of these methods is particularly effective in maintaining constant concentration levels within the system itself since, as the water is evaporated, the dissolved solids and chemical additives naturally tend to become more concentrated. Moreover, even the rate of evaporation will change due to variations in water temperature and relative humidity of the air. Accordingly, the demand for fresh water dilution can vary considerably with changes in external conditions. In air conditioning systems, for example, the water temperature varies with the load, that is, with the amount of heat that is removed to keep a given temperature within an air-conditioned space. The output from heat sources within the space and the outdoor temperature can be important factors affecting the load.

More recently, certain servomechanisms have been developed which are intended to maintain a given concentration of water characteristic at a predetermined level. The addition of the particular treatment ingredient used in maintaining the desired level is controlled by measuring the existing level in the system. But, even precision servomechanisms intended to maintain very exact concentrations have not been able to achieve any substantial protection from corrosion and scale damage. The reason is that close relationships exist among the various water characteristics and treatment chemicals used in their control. A variation in one control level or in the concentration of one chemical ingredient can seriously affect proper control of the others and the overall effectiveness of the system. This militates against obtaining effective internal treatment by independent control of each water characteristic no matter how accurately each control apparatus operates. Moreover, the expense of providing a separate precision servo control for each water characteristic is normally not economically feasible.

An automatic water conditioning system in accordance with this invention, however, effectively suppresses corrosion and scale formation and prevents system failure, while avoiding the expense of high precision servo devices sometimes used in controlling chemical treatments. Moreover, requirements for fresh water and chemicals are reduced resulting in substantial cost savings in system operation. With this system, individual water characteristics are measured, as hereinafter described, to control the additions of treatment chemicals and fresh water to the system. Effective treatment control can be achieved using simple level responsive switching devices. Also, overall corrosive tendencies in the system are monitored to insure that effective treatment levels are being maintained. The various treatment control devices are interlocked through a simple solenoid switching arrangement and also through the water in the system itself to insure that corrosion and scaling tendencies are being properly suppressed and that due warning is given of a system malfunction.

At the outset it should be understood that the invention is not limited to the particular combination of chemical treatment devices described in the preferred embodiment. The particular water treatments employed will for the most part be determined by the characteristics of the water and the water circulating system so that one or more of the treatments shown herein may be omitted or others may be added as necessary or desired.

In the preferred embodiment shown in FIG. 1, a sample pump 34 draws off a continuous water sample from the main circulation path between the outlet from the condensers and heat exchangers 16 and the cooling tower 20. The higher water temperatures at this point maximize corrosion tendencies and also scale formation since calcium carbonate becomes less soluble at higher water temperatures.

A pH meter 36 measures the relative acidity or alkalinity of the water in the sample stream to control the addition of acid. The pH meter 36 generates an output current directly proportional to the measured value of pH to be applied to the actuating coil 38 of a solenoid. The solenoid closes a normally open switch 40 when the current through the coil 38 exceeds a given value indicative of an upper predetermined pH level. For example, the pH meter 36 may be calibrated to close the switch 40 whenever the pH value exceeds approximately 6.8. Then the switch is held closed until the pH value falls below a predetermined lower level of approximately 6.5. Closing of the normally open switch 40 connects a 110-volt AC line source through a pair of normally closed interlock switches 42 and 44 to operate a pump motor 46, which drives an acid pump 48. The pump 48, or alternatively a suitable valve arrangement, provides a constant flow of acid from a tank 50 to be mixed with the water in the system. The acid flow gradually reduces the pH of the water until the lower pH level of 6.5 is reached in the sample stream. At that time, the solenoid releases to open the switch 40 which shuts off the motor 46 to stop the pump 48.

Any conventional pH meter apparatus can be employed if it can be suitably modified to provide an output current for use in operating the solenoid switch 40. Normally, sulfuric acid solutions have been found best suited for reducing the pH value to suppress scale formation. However, because of the difficulties encountered in handling highly corrosive sulfuric acid, other acids such as sulfamic acid and even some solid acids can sometimes be used instead. It should be understood that fresh water supplies in some areas might be overly acidic instead of alkaline. In that case, the pH meter is used to control the addition of an alkali to raise pH to the level necessary to prevent corrosion.

The most commonly used corrosion inhibitor additives are chromate salts, such as sodium dichromate $$(N_a(CrO_4)_2 \cdot 10H_2O)$$

and certain mixtures of chromates with polyphosphates commonly known as dianodic inhibitors. Dissolved chromate salts possess a characteristic yellow color that can be used to advantage in controlling its concentration in the system. Other inhibitors such as pure polyphosphates that do not possess their own characteristic color may be combined in specified proportions with a dye material to give the same effect. The color permits use of a colorimeter device 52 to measure the inhibitor concentration as a function of the color intensity. The output signal obtained from the colorimeter 52, which is made inversely proportional to the inhibitor concentration, is connected to flow through the actuating coil 54 of a solenoid to control the addition of inhibitor to the water. Whenever the inhibitor concentration falls below a predetermined level, the solenoid closes a normally open switch 56 to deliver power from the 110-volt AC line source through a pair of normally closed interlock switches 58 and 60 to actuate a pump motor 62. A pump 66 coupled for operation by the motor 62 adds a concentrated solution of corrosion inhibitor from an appropriate storage tank 64 to the water in the system at a constant rate. The switch 56 opens to shut off the motor 62 to stop the pump 66 when the corrosion inhibitor concentration measured by the colorimeter 52 reaches a predetermined upper limit. At that point the current output from the colorimeter 52 is no longer sufficient to hold the switch contact 56 closed so that it returns to its normally open position.

FIG. 1 shows the acid and the inhibitor being added from the acid pump 48 and the inhibitor pump 66 directly to the water in the cold well 12, where treatment chemicals are usually added in such systems. However, it has been found best to add the acid and corrosion inhibitor solutions to the water just prior to its entry into the cooling tower since the turbulence created by the spray more thoroughly mixes the concentrated chemicals with the water. Thorough mixing insures more uniform distribution of the chemicals throughout the system so that the added chemicals are not dangerously concentrated at one point in the flow path. Localized high concentrations of treatment chemicals could also cause erratic system operation.

The conductivity of the water is a function of the concentration of dissolved solids. The original concentration of dissolved solids in the fresh feed water increases with continued recirculation at a rate dependent upon the evaporation. Chemical treatments added, particularly corrosion inhibitor salts also contribute to the conductivity level present. In recirculating water systems, limiting the average number of recirculations holds down the conductivity. Thus recirculating water having high concentrations of dissolved solids is drained from the system to be replaced with fresh make-up feed water.

In previous systems conductivity has been controlled by simply replacing the water in the system at a constant rate with fresh make-up feed. In the present system, however, a conductivity meter 70 measures the concentration of dissolved solids in the sample stream to control a solenoid operated bleed 72 that drains circulating water from the cold well 12. High conductivity water drained in this manner is replaced automatically by the float operated make-up feed valve 24 which acts, as previously explained, to maintain a constant liquid level in the cold well 12. The output from the conductivity meter 70, which normally is directly proportional to the measured conductivity level, causes current to flow through a solenoid actuating coil 74. When the conductivity level reaches a predetermined level, the current flow through coil 74 is sufficient to close a normally open solenoid switch 76 that applies operating current from the 110-volt AC line source through a pair of normally closed interlock switches 78 and 80 to the actuating coil 82 of the solenoid operated bleed valve 72. As high conductivity water drains to be replaced by fresh feed water from the make-up feed water tank 22, the conductivity measured by the meter 70 gradually falls to a predetermined lower value, where the solenoid operated switch 76 opens to close the bleed valve 72.

Overall functioning of the other control apparatus is monitored and controlled by means of a corrosion meter 84. In the preferred embodiment of this invention the corrosion meter 84 is of the type capable of measuring the anodic corrosion rate in the system. The anodic corrosion tendency of the water is a function of many variables including water temperature, pH level, conductivity, the corosion inhibitor concentration, the concentration of dissolved oxygen and the flow rate through the system. The corrosion meter sensing element, which in the preferred form of the invention is a probe 86 mounting a pair of electrodes, is preferably placed in the flow stream closely adjacent the outlet from the condensers and heat exchanger 16, where the maximum water temperatures, and thus the maximum corrosion rate, exist.

A DC current indicative of the measured corrosion rate is obtained from the corrosion meter 84 to be applied to a solenoid coil 88. The solenoid operates to close a normally open switch 90 when the corrosion exceeds a predetermined amount. Closing of the switch 90 connects current from the 110-volt AC source to actuate a slow release relay 92, shown herein as a solenoid coil connected in parallel with a capacitor, and to initiate operation of an alarm device 94 to signal the occurrence of an abnormally high corrosion rate. The slow release relay 92 when actuated opens the normally closed switches 42 and 58 to interrupt further automatic operation of the pH and corrosion inhibitor concentration control apparatus by interrupting the flow of operating current to the acid pump 46 and the corrosion inhibitor pump 62. Also, the two position switch 78, which is normally closed to provide operating current to the bleed valve solenoid coil 82 when the normally open switch 76 is closed, is shifted to its other position to connect the 110-volt AC source directly to the normally closed switch 80. As a result, the solenoid operated bleed valve 72 is held open to drain water from the system continuously until the slow release relay 92 releases to return the switches 42, 58 and 78 to their normal closed positions. Water discharged from the system during this period is replaced by fresh make-up feed water through the float operated make-up feed valve 24. Thus, during the period that the slow release relay 92 remains actuated, the corrosive water previously circulating in the system is greatly diluted to remove the corrosive condition. Thereafter, the pH control, the corrosion inhibitor control and the conductivity control are returned to normal automatic operation by closing of the switches 42, 58 and 78.

Assume that for some reason the corrosive condition resulted from the malfunctioning of one or more of the other control elements 36, 52 or 70. For example, the pH meter might malfunction to add excessive acid which lowers the pH to a value that is extremely corrosive to the metal. In that case, returning the system to normal automatic control would result in the same corrosive condition again being established. Then normal automatic control would again be interrupted for the period established by the slow release relay 92 while the system was flushed a second time to dilute the corrosive condition fresh water from the make-up feed tank 22. Flushing of the system would be repeated again and again until a non-corrosive condition could once more be established. If the condition could not be removed, at least the system would be operating with mostly fresh water until the malfunction was detected eand could be corrected. Accordingly, measurement of the corrosion rate acts as an interlock mechanism to prevent the system from continuing to operate with a highly corrosive condition existing.

Normally, however, the corrosive condition can be removed by a single flushing of the water from the system. If the malfunction that produced the corrosive condition in the first place does not continue, then the return of the control elements to automatic operation restores the desired water characteristic by reestablishing the pH and the concentrations of corrosion inhibitor and dissolved solids to their previously set levels.

The alarm 94 is provided to alert attendant personnel to the occurrence of each overly corrosive condition. The alarm device employed can be both visual and audible and may be local or remote or both. The alarm should alert attendant personnel on duty at a remote central observation station. To avoid the necessity of continuous observation the alarm should be of the type requiring a manual reset after each actuation. This will insure each occurrence of a corrosive condition is properly noted by someone. Before resetting the alarm device, each control component should be checked for a possible malfunction that could have caused the corrosive condition.

Operation of the various system components can be monitored using a multitrack line trace recorder device 96 which gives a visual time record of the occurrence of each event. The visual record aids in determining optimum operating levels for the system and provides valuable information as to the cause of any malfunction. The recorder 96 which may be any conventional type contains one or more elongated paper strips 98 that move in a longitudinal direction at a fixed rate of speed and may contain transverse visual time markings 99. Each trace is produced by a pen whose transverse position on the chart is determined by the magnitude of an applied signal. For example, a bilevel trace of the acid pump operation is achieved by connecting the power input of the acid pump motor 46 to the pin recorder 96 at point A. The line trace remains at a first level during the period when the acid pump 48 is off, and assumes a second level when the acid pump 48 is turned on. Since the acid flow is constant during the time that the pump 48 is on, the total amount of acid added to the system is shown by the line trace. Similarly, the power input to the pump motor 62 is connected to the recorder at B to record the addition of corrosion inhibitor to the system as a bilevel trace, and the operation of the bleed valve 24 is recorded as a bilevel trace by connecting the input of the actuating coil 30 of the solenoid operated bleed valve to the recorder at C. The corrosion rate, on the other hand, is recorded directly by connecting the output from the corrosion meter 84 at D to provide a continuous record of variations in the relative corrosion rate.

Although a single multitrack line trace recorder 96 has been illustrated herein FIG. 1 for simplicity, an actual automatic water conditioning system built in accordance with the invention makes use of a different recorder apparatus for each trace. The different recorders can better be adapted to receive the different signals and can more easily be independently calibrated for accuracy.

For safety, the various automatic control elements for adding acid, corrosion inhibitor and for removing water from the system should be interlocked with the operation of the main circulation pump 14 through the solenoid actuated normally closed switches 44, 60 and 80. An electric drive motor 100, which receives 440-volts of alternating current from a line source, is coupled to operate the main circulation pump 14. The alternating current for driving the motor 100 flows through the primary winding of a transformer 102. As long as the motor 100 is operating, the secondary winding of the transformer 102 delivers actuating current to a series connected solenoid coil 104 sufficient to maintain the interlock switches 44, 60 and 80 in their normally closed positions. These switches, though normally closed by the solenoid, are biased towards the open position. Thus, whenever the main circulation pump 14 is turned off, the switches open to prevent further addition of treatment chemicals and further drainage of water from the system. This not only prevents waste but also prevents the treatment chemicals from accumulating in one portion of the system because the water is not circulating to insure proper distribution throughout the system.

Automatic water conditioning systems constructed in accordance with this invention also have the unique advantage which permits optimum treatment levels to be ascertained. Most information presently available on recommended water treatment levels is based upon empirical data developed without regard to the interrelationships among the various water characteristics and treatment chemicals. Actual operation of systems in accordance with this invention has shown certain previously recommended levels to be wasteful of treatment chemicals and, in some cases, even harmful to the system. The various relationships affecting system operation will be described by way of example hereinafter; first, however, it might be helpful to consider certain detailed aspects about the various control components which are used in a preferred embodiment of the invention.

Figure 2:
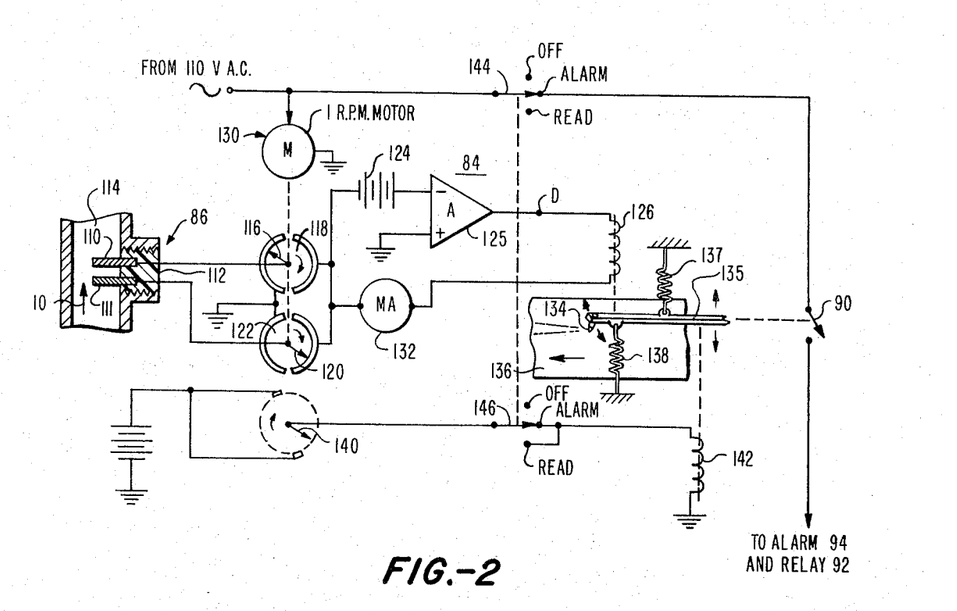
FIG. 2 is a schematic circuit diagram illustrating a preferred form of corrosion meter for use in an automatic water conditioning system in accordance with the invention.

Referring now to FIG. 2, which contains a simplified circuit diagram for a preferred form of corrosion rate meter 84, an indication of the relative corrosion rate and the pitting tendency within the system may be obtained automatically using this device. The sensing device 86 contains a pair of conducting metal electrodes 110 and 111 insulated from one another and mounted within a probe 112. The probe 112 may have a threaded exterior proportioned to fit snugly into an opening in a section 114 of pipe forming the main circulation path so that the electrodes 110 and 111 extend into the water as it circulates through the system. Normally, the electrodes 110 and 111 are made of identical material and have identical shapes and sizes. However, the electrodes may be of different materials and of different shape and size, as desired, or a single probe may be used with the pipe itself 114 forming the other electrode. These alternatives require certain alterations to be made in the attached circuitry which will be obvious to those skilled in the art.

The electrode 110 is conductively coupled to the rotating wiper 116 of a segmented wafer switch 118. Similarly, the other metal electrode 111 is conductively coupled to the rotating wiper 120 of another segmented wafer switch 122. Each wafer switch 118 and 122 contains two roughly semicircular conductive switch segments arranged to be contacted by the rotating wipers 116 and 120. A first switch segment of each wafer switch is coupled to the negative terminal of a substantially fixed millivolt DC power supply 124, and to the output of an amplifier 125 through the actuating coil 126 of a line trace recorder and a microammeter 132. The opposite switch segment is connected to ground. A small timing motor 130 rotates the wipers 116 and 120 at a fixed speed, normally one revolution per minute, to contact first one and then the other semicircular conductive segments of the wafer switches 118 and 122. In this way, the voltage from the DC source 124 is applied to the electrodes 110 and 111 in a first direction for approximately one-half of each revolution, and in the other direction for approximately the other half of each revolution. This periodic polarity reversal prevents permanent change in the interface between the electrode and the surrounding water solution due to continued anodic or cathodic action. The voltage applied between the electrodes 110 and 111 should be in the order of the free corroding potential of the metal electrodes themselves, that is, in the order of about 40 millivolts, in order to prolong the usable life of the electrodes. To insure that the potential of the millivolt source 124 is faithfully reproduced across the electrodes 110 and 111, regardless of the impedance of the recorder actuating coil 126 or the microammeter 132, the amplifier 125 is operated in a negative feedback control mode.

The corrosion rate in the system is directly proportional to the magnitude of a corrosion current flowing between the electrodes 110 and 111 in response to the applied voltage. Initially, an unstable condition exists in which the current to potential relationship between the electrodes varies until the interfaces have been polarized. A condition of relative equilibrium is reached when interface polarization has been achieved, which is recognized by a stable, or in most cases, a nearly stable current-potential relationship in which the corrosion current flowing between electrodes changes at a constant slow rate. Equilibrium is normally achieved anywhere from approximately fifteen to thirty seconds after the initial application of a polarizing voltage to the electrodes 110 and 111. Once equilibrium is achieved, then the polarizing current flowing between the two electrodes 110 and 111 is directly proportional to the corrosion rate at the interface when the electrodes corrode at their free electrode potential. A more complete explanation of some of the terms used herein and the principles on which such a corrosion rate measurement is based may be found in the "Corrosion Handbook" by Herbert H. Uhlig, published in 1948, by John Wiley & Sons, and in the discussion found in the U.S. Patent No. 3,069,332 to R. G. Syle issued Dec. 18, 1962.

The voltage applied to the electrodes 110 and 111 by the source 124 is not critical if they are in the millivolt range, since the purpose of the measurement is not to determine absolute corrosion rate, but only to obtain an indication of a relative corrosion rate. Accordingly, the corrosion rate meter 84 may be calibrated for any applied voltage within a certain wide millivolt range. However, it should be understood that too large a voltage could produce unwanted electrolysis effects at the electrode surfaces which might interfere with the accuracy of the measurements.

After a polarizing voltage is applied across the electrodes 110 and 111, the resulting polarizing current flow during the period of application may be read from the microammeter 132 connected to receive the output from the amplifier 125. To insure that the same equilibrium condition exists during measuring, each current reading is delayed a fixed interval of between ten and twenty-five seconds after the initial application. The current reading taken at that time may then be recorded as an accurate indication of the relative corrosion rate.

For simplicity the corrosion rate recording instrument, which is shown separately in this FIG. 2 is illustrated as comprising a marking pen 134 mounted on a pivoted arm 135, which is movable transversely with respect to the direction of movement of the recording paper 136, and is also movable in a direction normal to the paper surface. A spring arrangement 137 applies an upward biasing force to the arm 135 to hold the pen 134 away from the paper surface. Another spring arrangement 138 applies a transverse force to the arm 135 biasing it towards a normal zero indication. The polarizing current flow between the electrodes 110 and 111 is amplified by the DC amplifier 125, the output of which is coupled at the point D to the recorder actuating coil 126. The electromotive force of the solenoid coil 126 is coupled to oppose the bias force of the spring arrangement 138 so as to transversely position the pen 134 at a point indicative of the polarizing current flow. Each time the voltage polarity is reversed across the electrodes 110 and 111, the initial polarizing current flow at first becomes a maximum and then begins to decrease gradually as equilibrium is approached, at first fairly rapidly and then more slowly as wipers 116 and 120 approach the end of their respective semicircular segments. When the current-potential relationship has stabilized, the polarizing current flow may then be recorded as indicative of the relative corrosion rate.

To insure recording at exactly the same time after each polarity reversal, another rotating wiper 140 is coupled for rotation by the motor 130. Two small conductive segments are placed opposite one another relative to the center of rotation to be contacted as the wiper 140 rotates. The wiper 140 and the small conductive segments are aligned so that contact is made as the wipers 118 and 120 approach the end of their respective semicircular segments. At such times current from the source 124 through the wiper 140 to a solenoid actuating coil 142 which produces a downward force on the arm 135 to overcome the biasing force of the spring arrangement 137, thus causing the pen 134 to mark the paper 136. The transverse position of the mark relative to the zero position indicates the measured corrosion rate.

Actually, the corrosion reading obtained for one polarity may differ from that obtained in the other polarity. The difference results from certain effects at the electrode interfaces which are directly related to the pitting tendencies in the system. By reversing the polarity, as it is done here, the actual corrosion rate is more accurately obtained by taking the average between two successive readings. In addition, the pitting tendency is itself recorded as the difference between two successive readings. The recording marks shown on the paper 136 illustrate this relationship.

If desired, the closing of switch 90 by the output from the corrosion rate meter 84 can conveniently be controlled through a mechanical linkage to the arm 135, as shown here, rather than by use of the separate solenoid coil 88 shown in FIG. 1. The switch 90 closes to apply the 110-volt AC operating current to actuate the alarm 94 and the slow release relay 92. The corrosion rate needed to close the switch 90 may be varied by adjusting the mechanical linkage or by changing the amplifier gain. Such variable sensitivity switches are well known in the art, and therefore need not be discussed further herein.

For versatility, the corrosion rate meter 84 may be provided with a pair of ganged mode selection switches 144 and 146 which have "read," "alarm," and "off" positions. In the "alarm" position the line source is connected to actuate the alarm 94 and the slow release relay 92 when the switch 90 is closed, and the switch 146 completes a closed current path from the potential source 124 through the amplifier 128 to the electrodes 110 and 111. In the "read" position the switch 144 disconnects the line source from the alarm 94 and slow release relay 92, while the switch 146 maintains the current path for corrosion rate measurement. In the "off" position, the recorder power source is disconnected.

It should be understood that any corrosion rate measuring device may be employed in the automatic water conditioning system in accordance with this invention to perform the function stated herein. Nevertheless, the circuit arrangement shown in FIG. 2 has certain distinctive advantages in accuracy and reliability which may be considered particularly advantageous to the overall system operation. On the other hand, some systems will not require continuous measurements of corrosion rate. It might be sufficient to interrupt further operation and sound an alarm only when total corrosion exceeds a given limit, thereby preventing unexpected failures. For example, a simple means for measuring corrosion can be formed with a corroding metal wire disposed in the water flow. The wire can be tensioned to hold the switch 90 open against a closing force so that, when the wire breaks from corrosion, the switch 90 closes to activate the interlock mechanism. Such a device, though extremely simple, makes an effective and fairly accurate corrosion meter. The size and composition of the wire can be chosen to measure a specific total corrosion. A thin wire that can easily be replaced can act to periodically flush the system with a frequency dependent on the corrosion rate, thus protecting the system in much the same way as the corrosion rate meter shown in FIG. 2. A heavy wire can be used as an additional safety device for the system to warm when the total corrosion damage has reached a dangerous level.

Figure 3:
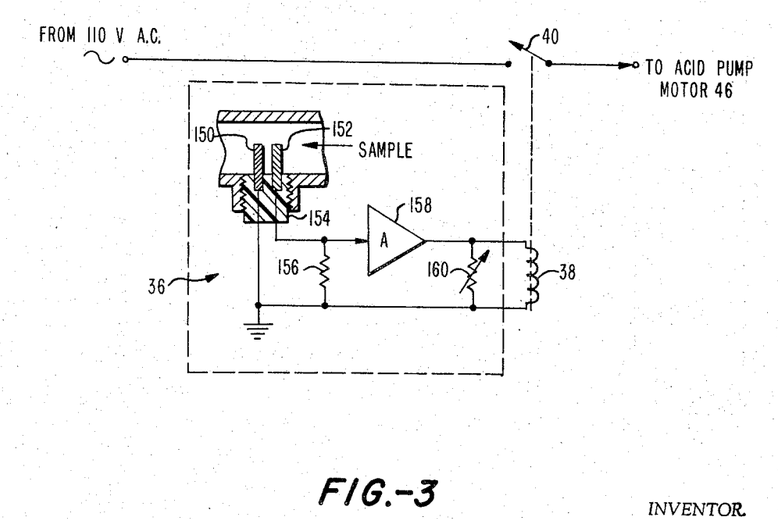
FIG. 3 is a schematic circuit diagram illustrating a preferred form of pH controller for use in an automatic water conditioning system in accordance with the invention.

Referring to FIG. 3, there is shown a preferred form of conventional pH meter for use in the automatic water conditioning system in accordance with this invention. Actually, the type of device to be described does not directly measure the pH, but instead measures the oxidation-reduction potential existing between the electrodes. This potential is a very good approximation since it is almost directly related to the actual pH value. Only where an accurate measure of the absolute pH valve is needed is an actual pH meter ever employed, since the device used herein has a much lower cost. For the purposes of this invention, the relative determination of pH value provided by this device is adequate. Because these devices are well known in the art, the meter circuit will only be generally described herein. In accordance with well-known principles, a calomel reference electrode 150 and an antimony electrode 152, which are held apart and insulated from one another by the body of a probe 154, are inserted through an opening provided in the sample line to extend into the sample stream. The calomel reference electrode 150 assumes the potential of the water in the sample stream whereas the antimony electrode 152 develops a potential related to the pH value. The resulting voltage difference between the electrodes 150 and 152 is developed across an input resistor 156 of a DC amplifier 158. The current output from the amplifier 158, which is approximately directly proportional to the pH value measured, is applied to the solenoid coil 38 to control the normally open solenoid operated switch 40. A variable resistor 160 may be connected in parallel with the solenoid coil 39 to provide variable sensitivity by draining off a portion of the current flow from the amplifier output. The setting of the variable resistor 160 determines the pH value at which the normally open switch 40 is closed to actuate the acid pump motor 46. The pH measurements obtained with the pH meter 36 using calomel and antimony electrodes are accurate over an approximate range of pH values from 3.0 to 11.0, once properly calibrated.

While control of the pH by a pH meter is preferred, other means may be employed. For example, it is interesting to note that the interlock switching arrangement operated by the corrosion meter 84 itself can be used to effect pH control. Various means have been employed in the past for administering acid treatment on a proportional basis, that is, a certain amount of acid is added in accordance with the amount of fresh water added. If such a proportional control means were set to add acid at a rate in excess of that needed for maintaining a desired minimum pH level, then the output from the corrosion meter would be used to disable the proportional control means to prevent adding further acid whenever a corrosive condition caused by the excess acid was sensed. In this way, the excess acid added by the proportional control would keep the pH below a certain level, while the corrosion meter 84 would prevent the excess acid flow from lowering the pH below a certain level. Thus, without even using a pH meter, the pH of the water could be held within a narrow range at or near a desired level. Moreover, the corrosion meter 84 could itself be used to control the pH level in those rare instances in which the available fresh water supply has an acidic characteristic. In such a case, the measured corrosion rate would be used to control the addition of an alkaline substance to maintain the pH above a given level. When the anodic corrosion rate exceeded a desired level, a pump would be actuated to add an alkaline treatment to raise the pH.

Figure 4:
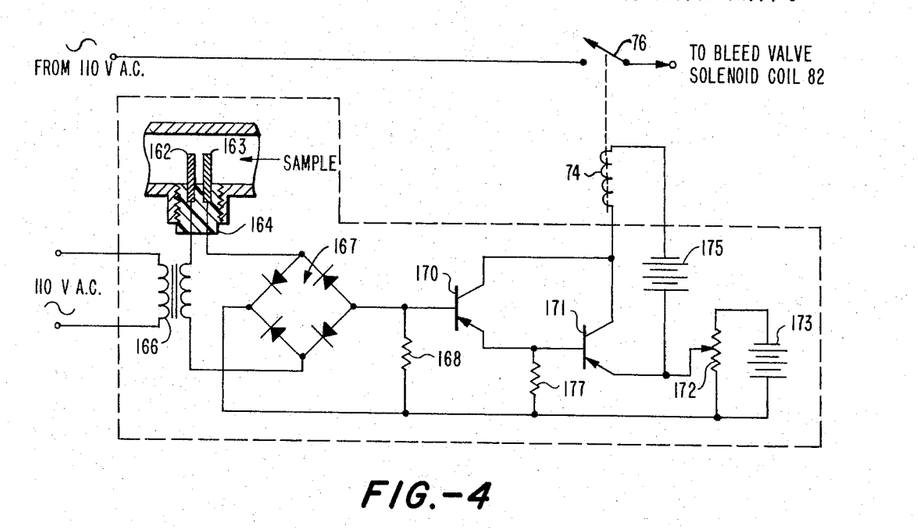
FIG. 4 is a schematic circuit diagram illustrating a preferred form of conductivity controller for use in an automatic system in accordance with the invention.

Referring now to FIG. 4, which illustrates one conventional method of measuring conductivity, a pair of carbon electrodes 162 and 163 are held apart and insulated from one another by the body of the probe 164. The probe 164 is inserted, like the pH probe, into an opening provided in the same line 154 so that the electrodes 162 and 163 extend into the sample stream. A low voltage alternating current derived from the 110-volt AC source by a stepdown transformer 166 is applied across the electrodes 162 and 163. Alternating current flows between the electrodes 162 and 163 due to the conductivity of the water sample, and the magnitude of this current flow will be directly proportional to the conductivity. The 60-cycle alternating current prevents a build up of anodic and cathodic effects at the electrode surface that might interfere with the accuracy of the conductivity measurement.

The alternating current is rectified by a diode bridge 167 to develop across an input resistor 168 a DC voltage representative of the conductivity. A pair of compound connected PNP transistors 170 and 171 are used to compare this voltage with a reference voltage determined by the setting of a potentiometer 172 that is connected across a direct current source 173. As is well known, the compound connection of the transistors 170 and 171 in this manner (sometimes referred to as a Darlington circuit) provides greater linearity of response over a wider range of voltages than is obtainable with a single transistor. The negative collector potential for the transistors 170 and 171 is obtained from another DC source 175 through the solenoid coil 74 which acts to close the normally open switch 76 to apply line operating current to open the solenoid operated bleed valve 72. A resistor 177 connected at the junction between the emitter of transistor 170 and the base of transistor 171 insures proper bleeding of base current from the transistor 171 to prevent the build up of a permanent charge.

In operation, as the conductivity level of the water between the electrodes 162 and 163 rises, the DC input voltage across the resistor 168 increases. This causes the base of the PNP transistor 170 to become more negative with respect to the emitter of the transistor 171, which tends to increase current flow from the DC source 175 through the transistors and the solenoid coil 74. Finally, the normally open switch 76 is eventually closed by the electromotive force produced by the current flow through the solenoid coil 74 when the conductivity has reached the predetermined response level established by the setting of the tap on the potentiometer 172. Of course, other methods and circuits for measuring the relative conductivity of the sample will be obvious to those skilled in the art, and may be used in a similar fashion to control the opening and closing of the normally open switch 76.

Figure 5:
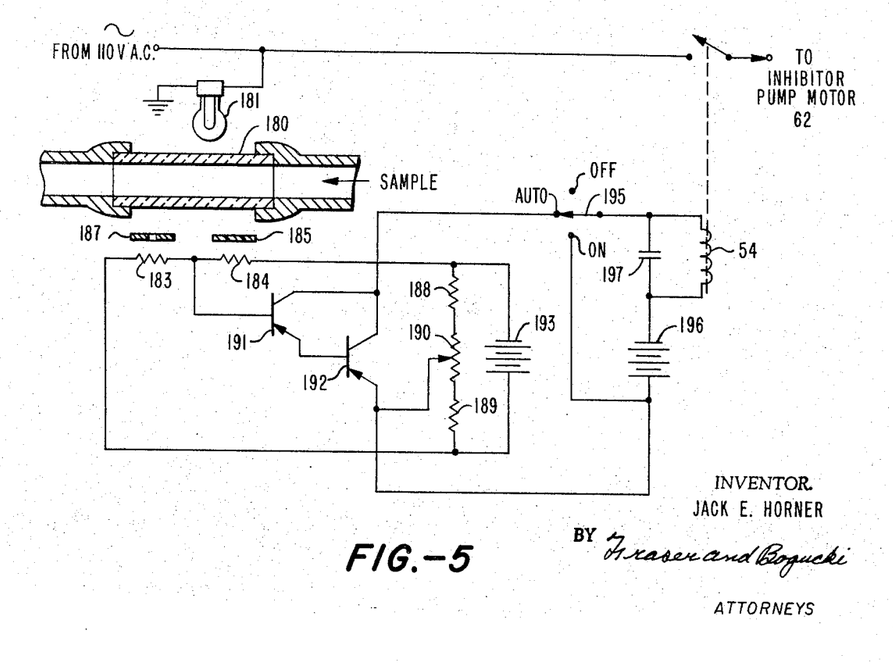
FIG. 5 is a schematic circuit diagram illustrating a preferred form of colorimeter for controlling the level of corrosion inhibitor in an automatic system in accordance with the invention.

Referring now to FIG. 5, there is shown a well-known colorimeter arrangement which may be used for controlling the addition of corrosion inhibitor to the system. The water sample flows through a transparent section 180 composed of clear glass or plastic. A white light source 181 operating on alternating current from the 110-volt AC line supply is located on one side of the transparent section 180 to direct its light through the sample flow. On the opposite side are a pair of photosensitive resistors 183 and 184 that respond to the intensity of visible light reaching them. For purposes of this discussion, it is assumed that the corrosion inhibitor being used as a chromate salt with a characteristic yellow-orange color, although as previously explained the color may be provided by dye substances mixed with the inhibitor solution. A color filter 185 is placed in front of the photosensitive resistor 184 to absorb light passing through the sample and having the same color as the inhibitor. With chromate inhibitors a blue filter having a pass band from approximately 0.41 to 0.48 micron is chosen to exclude the yellow light passed by the chromate solution. As the concentration of the corrosion inhibitor increases, its characteristic color in the sample intensifies to absorb more light of other colors so as to prevent it from reaching the color filter 185. More specifically, the intensified yellow color of the water resulting from a greater concentration of chromate inhibitor passes less blue colored light through the sample. Accordingly, there is less blue light available for passage through the blue filter 184 to reach the photosensitive resistor 184, and the resistance of the photosensitive resistor 184 increases with less light.

The other photosensitive resistor 183 acts as a light intensity reference. If necessary, an opaque shield 187 with a small hole can be placed in front of the photosensitive resistor 183 to reduce the amount of light from the source 181 to an acceptable level and to exclude light from other sources. The photosensitive resistors 183 and 184 form two legs of a sensing bridge. The other two legs of the bridge consist of fixed resistors 188 and 189 connected on either side of a potentiometer 190 so that the total resistance in each of these legs is equal to the value of the fixed resistor plus the resistance value on that side of the potentiometer tap setting. A pair of compound connected PNP transistors 191 and 192 are connected across the output terminals of the bridge. The base of the transistor 191 is connected to the junction between the photosensitive resistors 183 and 184 and the emitter of the other compound connected transistor 192 is coupled to the movable tap on the potentiometer 190. Operating voltage is applied to the input terminals of the bridge from a DC voltage source 193. The collector terminals of the compound connected transistors 191 and 192 are coupled through a three position selection switch 195 and the solenoid coil 54 to receive negative operating potential from another direct current source 196. The source 196 has its positive terminal coupled to the reference potentional at the adjustable tap of the potentiometer 190. If desired, a capacitor 197 may be connected in parallel across the solenoid coil 54 in the usual manner to stabilize the operation of the solenoid operated switching circuit.

In operation, as the inhibitor concentration increases, less light passes through the color filter 185 as compared to the light passing through the shield 187. This raises the resistance of the photosensitive resistor 184 relative to the photosensitive resistor 183, thus making the potential at the base of the compound connected transistor 191 more positive with respect to the emitter potential of the transistor 192. With the PNP transistors this potential relation tends to reduce conduction from the source 196 through the solenoid coil 54. On the other hand, as the inhibitor concentration falls, a greater amount of light reaches the photosensitive resistor 184 through the filter 185 to lower its resistance value relative toward that of the photosensitive resistor 183. This drives the base potential of the transistor 191 more negative with respect to the emitter potential on the transistor 192, thus causing greater conduction. The point at which the transistors conduct sufficient current flow through the solenoid coil 54 to close normally open switch 56, thus actuating the inhibitor pump motor 62, is chosen by the setting of the tap on the potentiometer 190.

The three-position mode selection switch 195 is shown in its "auto" position, in which the closing of the solenoid operated switch 56 is automatically controlled by the colorimeter circuit. The switch 195 also has "off" and "on" positions. In the "on" position, the solenoid coil 54 is connected directly across the potential source 196 to keep the normally open switch 56 closed. In the "off" position, the solenoid coil 54 is merely open circuited. Similar mode selection switches may be provided for the other automatic control circuits shown in FIGS. 2, 3 and 4, if desired, but the same result can usually be accomplished simply by varying the level setting. In this instance, however, such manual control of the inhibitor concentration without changing the control level can be particularly useful. It has been found from operation of an automatic water conditioning system in accordance with this invention that the most economical use of an anodic inhibitor such as chromate can be achieved using significantly higher inhibitor concentrations for a relatively short initial period to form a protective inhibitor film upon the metallic surfaces. Once the film has been established, corrosion can thereafter be effectively suppressed using concentrations much lower than what would normally be required had the film not first been formed. For example, in one particular installation a chromate inhibitor concentration of 100 parts per million (p.p.m.) was needed on a continuing basis for effectively suppressing corrosion. However, when the concentration was established at 1500 p.p.m. for an initial period of twelve hours to establish a protective coating, the same corrosion suppression could be achieved thereafter with a continuous chromate concentration of only 60 p.p.m. During the initial period used for establishing the protective inhibitor film, the higher concentration level need only be roughly maintained. Thus, automatic control is not used because this high a concentration level does not lend itself to colorimetric control by a device intended primarily for controlling much lower concentration levels.

Each measurement and control apparatus illustrated in FIGS. 2, 3, 4 and 5 has been described herein to help in understanding the interrelationships existing among the various measurements made and control functions being performed. As may be seen, each control function is not only interlocked with the others through operation of the switching arrangement controlled by the corrosion meter 84, but is also interlocked, to a greater or lesser extent, through the circulating water itself. In other words, each water characteristic and its method of control has some effect on the control of one or more of the other water characteristics. Whereas the presence of these interrelationships have been the primary cause of shortcomings in previous automatic internal treatment controls, the present system takes advantage of the situation to achieve a dual interlocking action that provides a unique closed-loop control operation for suppressing corrosion and scale formation to a degree not heretofore attainable. The more important aspects of this feature are described hereinafter.

The current flow between the two metal electrodes 110 and 111 of the anodic corrosion rate meter illustrated and described in FIG. 2 to a large extent depends upon the conductivity of the solution in which they are immersed. Obviously, this current flow can only be related to a particular corrosion rate if the conductivity of the water in the system is known. Thus, if conductivity cannot be determined within certain narrow limits, then the current measured will not validly represent the actual corrosion rate and cannot be reliably used as an automatic control parameter. But, with the conductivity held at a given level under the control of the conductivity meter 70, the corrosion rate can then be measured automatically using a corrosion rate meter, like that shown in FIG. 2. The current flow accurately represents a particular corrosion rate at the established conductivity level, thus permitting it to be used to control the water characteristics.

In a similar manner, but to a somewhat lesser extent, the conductivity of the water between the electrodes 150 and 152 affects the control of pH by the apparatus shown in FIG. 3. Moreover, the conductivity level is directly related to corrosion resulting from galvanic activity. This type of corrosion activity is due to the presence of dissimilar metals in the system and is not measured by the anodic corrosion rate meter of the type shown in FIG. 2. But, galvanic corrosion can be held to a low fixed rate simply by limiting the conductivity level of the water.

Also, in controlling the conductivity and in ridding the system of overly corrosive conditions, the water drained to be replaced by fresh water contains previously added corrosion inhibitor and acid treatments. The dilution of the treated water in the system lowers the inhibitor concentration and raises the pH. As a result, more acid and corrosion inhibitor must be added to maintain the pH and inhibitor concentration levels needed to suppress scale formation and prevent an increase in the corrosion rate. In this regard, it should be noted that, even though the concentration of corrosion inhibitor remain constant, the corrosion rate measured by the meter 84 can markedly increase because the protective inhibitor film has been damaged. The previous inhibitor level established in the presence of the undamaged film might not properly suppress further corrosion with the film damaged. In this event, however, the corrosion meter 84 would sense the increased corrosion rate and thus monitors the effectiveness of the established inhibitor concentration level chosen by the control setting on the colorimeter 52.

The corrosion rate measured by the corrosion meter 84 also depends on the pH. A highly corrosive condition can result from the circulating water being either too acid or too alkaline. At the slightly acidic pH level normally established to prevent scaling, even a small decrease below this level would cause rapid acid corrosion of ferrous metal pipes in the system. But, the pH control apparatus used herein only functions to maintain the pH level below a given minimum by adding acid, and could not itself respond to cure an overly acidic condition. However, the corrosion meter 84 would detect the acid corrosion and thereafter raise the pH by adding fresh water to dilute the acid. In addition, it might be noted that the pH level can affect the color of certain dyes which might be mixed with a corrosion inhibitor to achieve colorimetric control.

Therefore, it is obvious that the various control apparatus cooperate with one another in a way that achieves a closed loop interlock control of water characteristics that suppresses corrosion and scale formation in a circulating water system to a degree not heretofore thought possible. In acting together in the manner contemplated by this invention, the various control elements aid one another in achieving a result far superior to any previously obtainable by operating each control element independently. Not only is the accuracy of the measurement and control of each water characteristic improved, but also the effectiveness of the established control levels in preventing corrosion is constantly being checked.

As previously mentioned, actual operation of an automatic water conditioning system constructed in accordance with this invention has shown that certain treatment levels previously prescribed did not represent optimum treatment conditions and in some cases actually proved harmful to the system. For example, it was found that a particular prescribed corrosion inhibitor concentration was only effective within a narrow range of pH values. The prescribed inhibitor level was too low for some pH values and wasteful of inhibitor chemicals at other pH values within the recommended pH range. By varying the different control parameters and studying the recordings made of its operation, optimum conditions can be established for any system and fresh water supply using this system. Moreover, such things as seasonal changes in the characteristics of the fresh water supply can readily be compensated with ease.

To illustrate the unique advantages of an automatic water treatment system in accordance with this invention, the following data is offered on the operation of an actual system located in Los Angeles, Calif. The automatic treatment control system was operated with a conventional 600 gallon capacity recirculating evaporative cooling system used primarily for cooling a space containing electrical switching equipment. Previously recommended internal water treatment standards for the area prescribed maintaining the pH between 6.8 and 7.2, the chromate corrosion inhibitor concentration at approximately 120 p.p.m., and the dissolved solid concentration at approximately 1500 p.p.m. Prior to the installation of the present automatic control system, the acid and corrosion inhibitor treatments were added periodically by a timer to the cold well. Circulating water was bled from the system at a constant rate to hold down the average number of recirculations so that conductivity did not exceed recommended levels, and make-up feed water was added through a float operated valve. Sometimes the amounts of chemicals added and the rate of bleed were varied to compensate for changes in the load on the system, but only on very hot or very cold days. Commercial sulfamic acid was used at a rate exceeding 28.6 pounds per month and relatively pure sodium chromate inhibitor was added at an average rate of approximately 22.0 pounds per month. In addition, approximately 22,000 gallons of fresh water per month were needed for make-up feed. Operated in this manner, the cooling system had several serious failures in the last five years due to corrosion damage or scale formation. Most of these failures required shutting down of the cooling system while extensive repairs were made, and in some instances expensive switching equipment was damaged by overheating before the failure was discovered.

In contrast, by use of the present automatic treatment system in accordance with the invention, it was found that scaling could be eliminated and very low corrosion rates of approximately 4 mils per year maintained if the pH level was maintained in a range between 6.3 and 6.7, and the concentration of dissolved solids was maintained at approximately 2,000 p.p.m. To establish the protective chromate film, a chromate concentration of 1500 p.p.m. was maintained for a period of forty-eight hours and thereafter reduced to a continuous control level of 60 p.p.m.

During an extended testing interval, the present system showed a considerable saving in chemical costs. Less expensive commercial sulfuric acid was used at a reduced rate of approximately 9.0 pounds per month, whereas the use rate of sodium chromate inhibitor was similarly reduced to 8.8 pounds per month. Upon sensing a high corrosive rate, the slow release relay 92 was set to keep the normally closed interlock switches 42 and 58 open for a full minute and half, during which time the automatic control of acid feed and conductivity were interrupted while circulating water was drained. At the particular pH value established, it was found best not to interrupt operation of the automatic chromate control during the draining period. During warm days with temperatures of approximately 90° F., the interlock switching arrangement was actuated on an average of twice each hour during the hottest period of the day. Nevertheless, the average fresh feed water consumption was reduced to about 18,000 gallons per month, which represents an important cost saving in areas where fresh water supplies are scarce, such as Los Angeles.

The low corrosion rate of approximately 4 mils per year established conforms to the desired life span of the cooling system, which at this rate can be expected to operate approximately twenty years without failing as a result of scale or corrosion damage. Moreover, further investigation and experimentation can be expected to establish the existence of an optimum condition at which the corrosion rate or chemical costs or both can be further reduced. Recent tests suggest that a low corrosion rate can be maintained at a pH value of approximately 5.8. The higher acid concentration at this pH level would tend to increase the effectiveness of the chromate corrosion inhibitor.

It should also be realized that a system in accordance with this invention allows other treatment chemicals to be tested under actual operating conditions. During these tests the various control levels can be varied independently or concurrently to study their effect on the system. If desired, a device capable of measuring the rate of scale formation in the system could be added to facilitate tests of new chemicals and further improve the overall system operation. The inclusion of such a device in the control system would act as an additional check on the operation of the pH meter to insure that the pH level is sufficiently low to prevent scaling.

Although a preferred embodiment of this invention has been described and illustrated herein, it will be understood that various changes, modifications and equivalent arrangements may be employed, other than those mentioned herein, without departing from the scope of the invention as expressed in the appended claims.

What is claimed is:

1. A system for treating industrial circulating water to suppress corrosion and scale formation comprising: first means responsive to the pH of the circulating water for automatically adding acid to maintain the pH below a predetermined value sufficient to prevent scale formation; second means responsive to the conductivity level of the circulating water for automatically draining circulating water and replacing it with fresh water of relatively low conductivity to maintain the conductivity level below a predetermined value; and third means responsive to the anodic corrosion rate of the circulating water for interrupting the automatic operation of the first and second means to prevent the addition of acid to the circulating water and to drain the circulating water and replace it with fresh water, said third means being actuated for a fixed time interval whenever the anodic corrosion rate exceeds a predetermined level, the amount of circulating water replaced with fresh water during the fixed time interval being sufficient to lower the corrosion rate.

2. A system for automatically treating circulating water comprising: means responsive to the pH of the circulating water for adding acid to maintain the pH within a predetermined range to prevent scale formation; means responsive to the conductivity of the circulating water for adding fresh water of relatively low conductivity to maintain the conductivity below a predetermined level; means for sensing the concentration of a corrosion inhibitor within the circulating water and for adding additional corrosion inhibitor to maintain the concentration above a predetermined level; and control means responsive to the anodic corrosion rate produced by the circulating water for replacing a fixed portion of the circulating water with fresh water whenever the anodic corrosion rate exceeds a predetermined level and for preventing the addition of acid during the time interval needed for replacing the circulating water.

3. A device for automatically measuring the corrosion rate within a circulating water system comprising: means for automatically replacing circulating water with fresh water of relatively low conductivity to maintain the conductivity level below a predetermined value; a pair of corroding metal electrodes immersed in the circulating water; a voltage source providing a voltage of constant magnitude in the order of the free corroding potential of the electrodes in the circulating water; automatic switch means for applying the voltage from the voltage source to said electrodes for a first fixed time interval sufficient to allow stabilization in the rate of change of current flow between the two electrodes and for automatically reversing the polarity of the voltage applied to the electrodes for a second time interval equal to the first; and means for automatically measuring the magnitude of the current flow at the end of each interval, whereby the average of the current flows measured at the end of the first and second intervals is directly proportional to the anodic corrosion rate in the system.

4. A system for automatically treating industrial water to prevent corrosion and scale formation in a circulating system comprising: means for adding acid to maintain the pH of the circulating water below a predetermined value necessary for preventing scale formation; and means responsive to the anodic corrosion rate produced by water in the circulating system for replacing the circulating water with fresh water having an alkaline pH value and low corrosive properties to prevent a corrosive condition from being maintained within the circulating system.

5. An industrial recirculating water system in which corrosion and scale formation are automatically suppressed comprising: a pH meter for producing a first signal indicative of the pH of the circulating water; means responsive to the first signal from the pH for adding acid to lower the pH of the circulating water whenever the first signal indicates a pH value above a predetermined level and for continuing to add acid until the first signal indicates a pH value slightly below the predetermined level; a conductivity meter for producing a second signal indicative of the conductivity level of the circulating water; means responsive to the second signal for replacing water circulating in the system with fresh water of low conductivity to maintain the conductivity below a predetermined level; a corrosion rate meter including a pair of corroding metal electrodes immersed in the circulating water for automatically measuring the anodic corrosion rate as a function of current flow between the electrodes, means for applying a voltage in the order of the free corroding potential of the electrodes in the first one polarity for a fixed interval of time to establish a stable rate of change in the current flow between the two electrodes and means for measuring the current flow between the electrodes near the end of each time interval as an indication of the anodic corrosion rate; and control means responsive to the magnitude of the measured current flow for interrupting the addition of acid and for replacing the circulating water with the fresh water to lower the corrosion rate whenever the magnitude of the current flow between the electrodes indicates an anodic corrosion rate exceeding a predetermined level.

6. An industrial recirculating water system in accordance with claim 5 further comprising: means responsive to an actuating signal for adding a corrosion inhibitor substance having a characteristic color to the circulating water in the system to suppress anodic corrosion; and a colorimeter device responsive to the characteristic color of the substance for producing an actuating signal whenever the concentration of the corrosion inhibitor falls below a predetermined level.

7. The system of claim 6 further including additional means responsive to the circulation of the water for maintaining said plurality of means disabled when the water is not being circulated.

8. A system for suppressing corrosion and scale formation tendencies in circulating water comprising: means for treating the water to maintain the pH level within a predetermined range; means for diluting the circulating water with fresh water to maintain the conductivity below a predetermined level; and means responsive to the corrosion tendencies of the circulating water for disabling said first and second means while replacing a fixed portion of the circulating water with fresh water whenever a given corrosion condition is sensed to thereby lower the corrosion tendencies of the circulating water.

9. A system for suppressing corrosion tendencies in circulating water comprising: a plurality of means, each responsive to a different water characteristic affecting the corrosion tendencies for controlling the addition of an appropriate ingredient to maintain the corresponding water characteristic at a predetermined level; means responsive to the corrosive tendencies of the circulating water for producing an output indicative of the corrosion level present; and means responsive to the output for temporarily disabling selected ones of said plurality of means when the corrosion level indicated exceeds a predetermined value, while at the same time replacing a portion of circulating water with fresh water having low corrosive tendencies.

10. A system for suppressing corrosion and scaling in circulating water systems comprising: a plurality of means, each operating independently to control a different one of several characteristics of the circulating water at predetermined levels including the pH, the conductivity and the concentration of a corrosion inhibitor; means providing an output signal indicative of the anodic corrosion tendencies in the circulating water; and means responsive to the output signal when the indicated anodic corrosion tendencies exceed a predetermined level for selectively disabling said plurality of means while adding fresh water to dilute the circulating water and thereby lower the anodic corrosion rate.

11. The system of claim 10 wherein said disabling means includes timing means for establishing a fixed interval during which said plurality of means are disabled while the circulating water is continuously drained to be replaced by the fresh water at a predetermined rate, said plurality of means being again enabled only after completion of the fixed interval.

12. A system for suppressing corrosion and scale formation in a circulating water system comprising: first means responsive to the pH of the circulating water for periodically adding a first ingredient to maintain the pH within a predetermined value range to prevent scale formation; a make-up feed source of fresh water; second means responsive to the conductivity level of the circulating water for draining circulating water at a given rate whenever the conductivity exceeds a predetermined level; means responsive to the amount of circulating water in the system for adding fresh water from the make-up feed source at a constant rate to maintain a substantially constant amount of circulating water in the system; and third means responsive to the corrosion rate of the circulating water for temporarily disabling said first and second means and for draining a fixed amount of circulating water from the system whenever the corrosion rate exceeds a predetermined level.

13. The system of claim 12 further including a time base recorder means responsive to the operation of said first, second and third means for providing visual records indicating the time of each operation of said first and second means and for plotting the amplitude variations in the corrosion rate.

14. The system of claim 12 wherein said third means includes an alarm device connected to be operated each time said third means temporarily disables said first and second means.

15. An automatic anodic corrosion rate measuring system for a circulating water system comprising: means for maintaining the conductivity of the circulating water within a predetermined value range; a pair of corroding metal electrodes immersed in the circulating water; a voltage source for applying a sensing voltage having a constant magnitude in the order of the free corroding potential of the electrodes across said pair of electrodes; automatic switching means for reversing the polarity of the sensing voltage across said electrodes at fixed time intervals; and means for automatically recording the magnitude of the current flow at a fixed point in time during each fixed time interval, whereby the magnitude of the current flow recorded is indicative of the anodic corrosion tendency in the circulating water.

16. A device for controlling pH in a circulating water system comprising: means responsive to the corrosion tendencies of the circulating water for generating an output signal indicative of the anodic corrosion rate; and means responsive to said output signal exceeding a predetermined level for controlling the addition of chemical treatments used for varying the pH level in the circulating water.

17. A control device for maintaining the pH of circulating water within a predetermined value range comprising; means responsive to the anodic corrosion tendencies in the circulating water for generating an output signal indicative of the anodic corrosion rate; means for adding chemical treatments automatically to vary the pH in the circulating water; and means responsive to said output signal for selectively enabling and disabling said means for adding chemical treatments to maintain the pH of the circulating water above a predetermined level.

18. An automatic water treatment system comprising: means for adding acid to vary the pH of the water; means responsive to the corrosion tendencies in the water for generating an output signal indicative of the anodic corrosion rate; and signal level sensing means responsive to the output signal for disabling said acid adding means whenever the output signal exceeds a predetermined level.

References Cited
UNITED STATES PATENTS

| | | | |
|---|---|---|---|
| 2,772,779 | 12/1956 | Norris | 137—93 X |
| 2,787,281 | 4/1957 | Word | 137—93 |
| 3,139,071 | 6/1964 | Rivers | 137—93 X |
| 3,195,551 | 7/1965 | Russell | 137—5 |

GEORGE F. MAUTZ, *Primary Examiner.*

UNITED STATES PATENT OFFICE
CERTIFICATE OF CORRECTION

Patent No. 3,361,150                              January 2, 1968

Jack E. Horner

It is hereby certified that error appears in the above numbered patent requiring correction and that the said Letters Patent should read as corrected below.

Column 2, line 36, "Comomnly" should read -- Commonly --. Column 4, lines 69 and 70, cancel "A float 26 or any other suitable liquid level in the cold well 12.". Column 7, line 66, "corosion" should read -- corrosion --. Column 8, line 48, "eand" should read -- and --. Column 12, line 49, "warm" should read -- warn --. Column 14, line 35, "as" should read -- is --. Column 17, line 49, "amounts" should read -- amount --. Column 18, line 14, "established." should read -- established, --. Column 19, line 51, after "pH" insert -- meter --.

Signed and sealed this 23rd day of September 1969.

(SEAL)
Attest:

EDWARD M. FLETCHER, JR.                    WILLIAM E. SCHUYLER, JR.
Attesting Officer                             Commissioner of Patents